United States Patent [19]

Grennes et al.

[11] Patent Number: 5,444,121

[45] Date of Patent: Aug. 22, 1995

[54] THIN-WALLED RUBBER ARTICLE WITH WALLS HAVING A RELATIVELY HIGH DEGREE OF TEAR

[75] Inventors: Torbjorn Grennes, Horsholm; Bent Nielsen, Frederiksberg, both of Denmark

[73] Assignee: DanPren A/S, Albertslund, Denmark

[21] Appl. No.: 136,459

[22] Filed: Oct. 15, 1993

[30] Foreign Application Priority Data

Jun. 18, 1993 [DK] Denmark .............................. 0722/93

[51] Int. Cl.⁶ .............................................. C08L 53/02
[52] U.S. Cl. ........................................ 525/89; 525/98; 525/99
[58] Field of Search .............................. 525/89, 98, 99

[56] References Cited

U.S. PATENT DOCUMENTS

| | | | |
|---|---|---|---|
| 3,933,723 | 1/1976 | Grenness | 260/33.6 A |
| 4,125,665 | 11/1978 | Bemmels et al. | 428/352 |
| 4,997,709 | 3/1991 | Huddleston et al. | 428/344 |
| 5,112,900 | 5/1992 | Buddenhagen et al. | 524/484 |

FOREIGN PATENT DOCUMENTS 2930554 1/1981 Germany .
2057916 4/1981 United Kingdom .

OTHER PUBLICATIONS

WO 91/13935, Avery Dennison Corporation, Sep. 1991.
Chemical Abstracts, vol. 94, No. 94:180698f, Sep. 13, 1993, as it pertains to "Copolymers for surgical dressings," Suzuki Nippondo Co., Ltd., Japan Kokai Tokkyo Koho 81 20,515 (Feb. 26, 1981).
Encyclopedia of Chemical Technology, Third Edition, vol. 8, Elastomers, Synthetic (Thermoplastic), pp. 626–632 (Jul. 24, 1987).

*Primary Examiner*—James J. Seidleck
*Assistant Examiner*—I. Zemel
*Attorney, Agent, or Firm*—Kerkam, Stowell, Kondracki & Clarke; Dennis P. Clarke

[57] ABSTRACT

A thin-walled rubber article with a high tear resistance prepared by dip forming, comprising styrene-isoprene-styrene (S-I-S) triblock copolymer, and styrene-butadiene-styrene (S-B-S)-triblock copolymer with a S-I-S content from 10–75% by weight.

7 Claims, 4 Drawing Sheets

THIN-WALLED RUBBER ARTICLE WITH WALLS HAVING A RELATIVELY HIGH DEGREE OF TEAR

BACKGROUND OF THE INVENTION

The present invention relates to a thin-walled rubber article, such as for instance gloves or condoms, prepared by dip forming. Morever, the invention relates to a process for the preparation of such rubber article and to a solution for the preparation of said rubber article.

Soft, elastomeric, protective rubber articles, for instance gloves or condoms, have for a long time been made from natural latex or natural rubber dissolved in a suitable solvent, for instance aliphatic hydrocarbons. In order to obtain articles with a sufficiently high strength and elasticity it is necessary to vulcanize or in other ways chemically cross-linking the molecule chains of the rubber, which requires the presence of curing-agents, activators, accelerators, and possibly antioxidants. The presence of such agents often give rise to allergic reactions among the users of said articles.

Furthermore, all latices of natural rubber contains proteins, which may cause type I allergy (immediate hypersensitivity reaction) resulting in fatal cases in anaphylactic chock.

Great efforts have therefore been made to develop rubber articles based on synthetically manufactured rubber types, which do not have the drawbacks of natural rubber.

Thus U.S. Pat. Nos. 3,933,723 and 5,112,900 both relate to solutions containing thermoplastic styrene-triblock copolymers and a plasticizer for the production of rubber articles. Common to the solutions disclosed in the two above-mentioned patents is that by the formation of the solid film a physical cross-linking takes place between the block copolymer molecules present in the solution, when the solvent evaporates, said cross-linking being caused by the styrene domains of the molecular chains. Thereby the use of potentially allergy causing chemicals for the provision of a chemical cross-linking between the block copolymer molecules is avoided. Furthermore, these solutions do not contain the proteins present in natural rubber, and it is thus possible by using these solutions to prepare hypo-allergenic rubber articles.

The rubber articles disclosed in U.S. Pat. No. 3,933,723 have in comparison with the rubber articles according to U.S. Pat. No. 5,112,900 a higher tensile strength and elongation, in particular after radiation sterilization. Furthermore, they have a lower modulus and consequently a better tactility for the user. However, the tear resistance of the rubber articles disclosed in U.S. Pat. No. 3,933,723 is low, and it is desirable to improve this property in such a way that for instance a glove gets a higher mechanical stability when getting in contact with pointed articles.

The rubber articles disclosed in both the above-mentioned U.S. patents contain in order to attain the desired mechanical properties comparatively large amounts of plasticizer, which is preferably constisuted by a naphthenic or aromatic mineral oil.

SUMMARY OF THE INVENTION

It has surprisingly turned out to be possible to replace the entire part or the major part of the naphthenic or aromatic oil disclosed in U.S. Pat. No. 3,933,723 by a styrene-isoprene-styren triblock copolymer (S-I-S triblock copolymer), thereby obtaining an unexpectedly high tear resistance. Besides, it has turned out that rubber articles in which the naphthenic or aromatic oil has been replaced by an S-I-S triblock copolymer, have an improved resistance towards yellowing and towards quick disintegration of the physical properties, when exposed to sunlight.

The object of the present invention, which is a further development of the subject matter disclosed in U.S. Pat. No. 3,933,723, is to provide a rubber article with high tensile strength and elongation even after radiation sterilization and a low modules, and which at the same time has an excellent tear resistance and good resistance towards the sunlight.

The object of the invention is met by providing a thin-walled rubber article comprising styrene-isoprene-styrene (S-I-S) triblock copolymer and styrene-butadiene-styren (S-B-S) triblock copolymer with a S-I-S content from 10 to 75% by weight.

Moreover, the invention relates to a process for the preparation of a thin-walled rubber article, said process comprising the steps of:

a) dipping a form in a blend comprising S-I-S triblock copolymer and S-B-S triblock copolymer with a S-I-S content from 10 to 75% by weight, dissolved in an inert solvent, b) removing the form from the solution, and, c) allowing the solvent to evaporate, which process may be repeated, until the rubber article has attained the desired wall-thickness.

As solvent for the copolymer blend any inert solvent may be used, a solvent mainly consisting of aliphatic hydrocarbons being, however, preferred, as vapours from aliphatic hydrocarbons have lower toxicity than for instance halogen-containing or aromatic solvents. To obtain a sufficiently good dissolution of the copolymer blend and good process properties the solvent may advantageously contain a smaller amount of aromatic compounds, for instance up to 10% by weight of the solvent mainly consisting of aliphatic hydrocarbons may be aromatic compounds. It is furthermore preferable that the aliphatic hydrocarbons have a boiling point between 95° C. and 140° C. Based on the blend of copolymers the amount of solvent preferably constitutes 400-1200% by weight.

The solution for the preparation of a rubber article according to the invention may contain more than one variant of each type of triblock copolymers to attain a desired viscosity of the solution and/or to attain the desired mechanical properties of the rubber article. By "more than one variant" is to be understood that the solution for each type of triblock copolymer may contain several variants of triblock copolymers with different styrene content and with different solution viscosity.

A triblock copolymer can, when the monomers, from which the blocks are built, are known, be unambiguously characterized by the viscosity of a predetermined concentration in a solvent and the content of the end blocks in the triblock coplymer. Thus a S-I-S triblock copolymer may unambiguously be characterized by its solution viscosity in a 25% by weight solution in toluene at a specified temperature and by its styrene content.

In the solution for the preparation of the rubber article according to the invention it is preferred to use a S-I-S triblock copolymer with a styrene content of from 10–30% by weight and a solution viscosity in a 25% by weight solution in toluene at 25° C. of 0.5–5 Pa.s.

S-I-S triblock copolymers may for instance be of the type sold under the name Cariflex TR1107 or Cariflex TR1111, which has a styrene content of 15% and 22% respectively, and a solution viscosity in a 25% by weight solution in toluene at 25° C. of 1.6 and 1.4 Pa.s., respectively.

As S-B-S triblock copolymers, copolymers with a very varying solution viscosity may be used, for instance with a solution viscosity in a 25% by weight solution in toluene at 25° C. of 0.5–30 Pa.s., but usually with a styrene content between 20 and 40% by weight. Examples of applicable S-B-S triblock copolymers, which may be used alone or in combination is: Cariflex TR1101 with a styrene content of 31% by weight and a solution viscosity in a 25% by weight solution in toluene at 25° C. of 4.0 Pa.s. Cariflex TR1102 with a styrene content of 29% by weight and a solution viscosity in a 25% by weight solution in toluene of 1.2 Pa.s, and Cariflex 1184 with a styrene content of 30% by weight and a solution viscosity in a 25% by weight solution in toluene at 25° of 20.0 Pa.s.

If a rubber article is prepared from a solution containing solely S-I-S triblock copolymers, the rubber article gets a very low modulus, and the viscosity of the solution will be too low for the preparation of suited rubbers articles by dip forming, as the walls of the rubber articles will be too thin and sticky.

If a rubber article is prepared from a solution containing solely S-B-S triblock copolymers, the modulus of the article will be too high, the article thus getting insufficient elasticity.

As mentioned above it has hitherto only been possible to prepare thin-walled rubber articles with satisfactory mechanical properties on basis of S-B-S triblock copolymers by adding to the solution fairly large amounts of plasticizer, in the form of a naphthenic or aromatic mineral oil. It has now unexpectedly turned out to be possible to completely or partly replace the hitherto used plasticizers by S-I-S triblock copolymers.

In a preferred embodiment of the invention the previously used naphthenic or aromatic mineral oils are completely replaced by S-I-S triblock copolymers. The content of S-B-S triblock copolymer is preferably from 1–90% by weight, in particular from 25–40% by weight of the blend of copolymers, and the remaining part is a S-I-S triblock copolymer. Still more preferred the blend of copolymers is constituted by about 1 part by weight S-B-S triblock copolymer and about 2 parts by weight S-I-S triblock copolymer. A thin-walled rubber article prepared from such a copolymer blend has, in addition to an excellent tear resistance, good resistance towards sunlight, but is somewhat sensitive to influence from ozone, as ozone will react with double bonds which are present in polymerized butadiene.

In another preferred embodiment of the invention a rubber article with a greater ozone resistance is provided thereby that a part of the S-B-S triblock coopolymer is replaced by styrene-olefin-styrene (S-O-S) triblock copolymers. Polymerized olefin is saturated, i.e. contains no double bonds, and is therefore less sensitive towards ozone. Such a substitution makes it necessary that the solvent, apart from aliphatic hydrocarbons, contains a smaller amount of aromatic hydrocarbons in order to attain an applicable solution and in order to secure the development of a polymer matrix in which the various polymer chains form an interpenetrating molecular network. Furthermore, the substitution necessitates the presence of a smaller amount of naphthenic oil.

As S-O-S triblock copolymer styrene-ethylene/butylene-styrene (S-EB-S) triblock copolymers may for instance be used, preferably with a styrene content of 10–30% by weight and a solution viscosity in a 25% by weight solution in toluene at 25° of 1–10 Pa.s.

Preferably, the thin-walled rubber article according to the second embodiment comprises 10 to 25% by weight S-B-S triblock copolymer, 10 to 25% by weight S-EB-S triblock copolymer and 60 to 75% by weight S-I-S triblock copolymer. More preferable the rubber article comprises about one part S-B-S triblock copolymer, about one part S-EB-S triblock copolymer and about 4 parts S-I-S triblock copolymer. The rubber article comprising this copolymer blend further contains preferably up to about 30% by weight of a naphthenic plasticizer, based on the copolymer blend.

If desired, the solution for the production of thin-walled rubber articles may contain commonly used stabilizers and additives. Such a stabilizer might for instance be a zinc dithiocarbamate.

Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENTS

All the specimen are prepared by dipping a condom-shaped form in the solution described below and then slowly removing the form from the solution, a thin, uniform layer of the solution thus adhering to the form. The form with the adhering amount of solution is then dried in an air current at room temperature to evaporate the solvent from the thin elastomeric layer. This process may be repeated until the rubber article has obtained the desired wall-thickness.

The solution is prepared by dissolving a copolymeric blend of S-I-S (Cariflex TR1111) and S-B-S (Cariflex TR1101) triblock copolymer in the amounts given in the abscissa in 850% by weight of a solvent consisting of aliphatic hydrocarbons with a boiling point from 95°–140° C., and then adding 0.5% by weight of zinc dibutyl-dithiocarbamate, the statement of amounts being based on 100% by weight of the copolymers.

Figure 1:
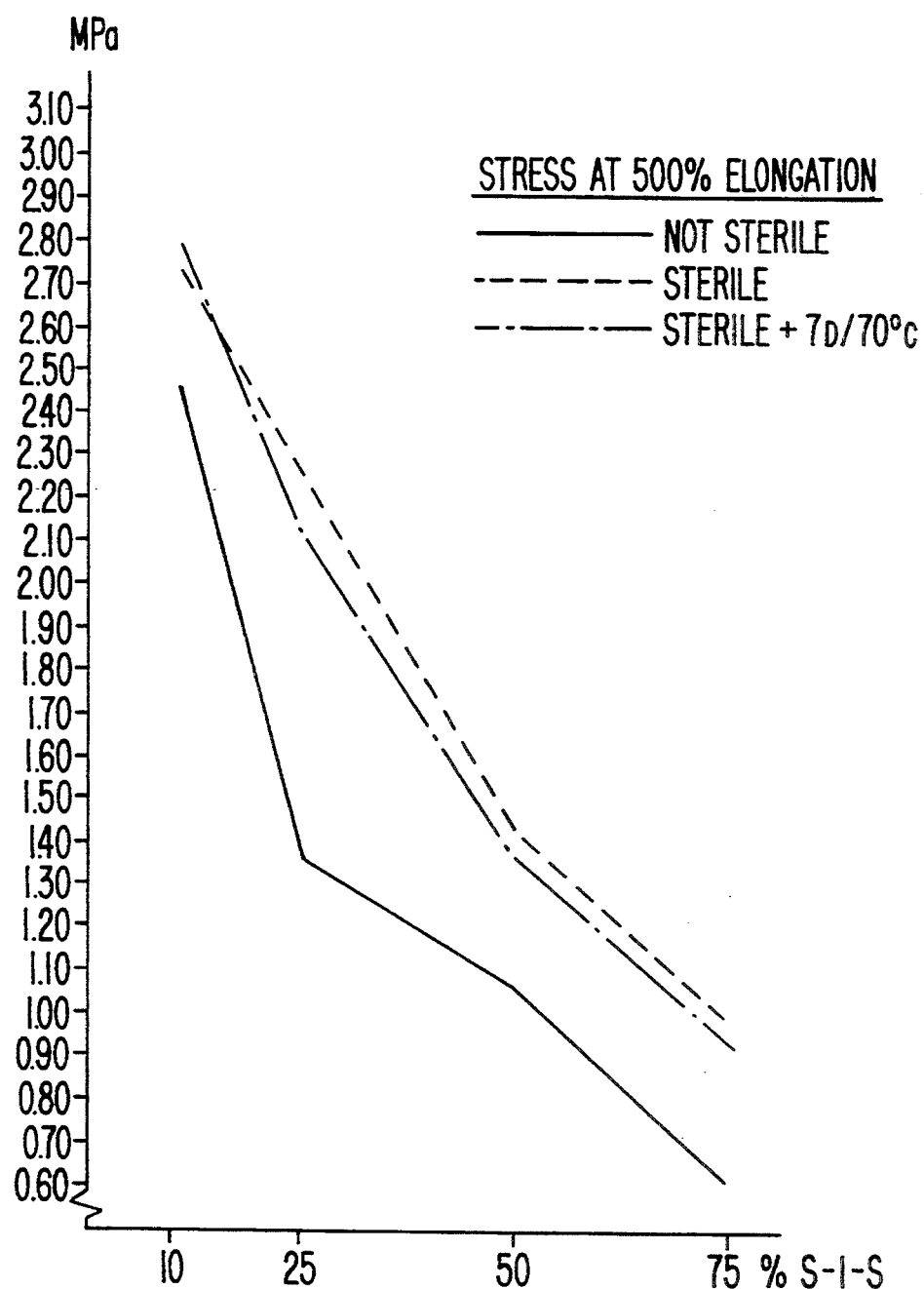
FIG. 1 shows modulus at an elongation of 500% of a not sterilized specimen, a sterilized specimen and a sterilized specimen aged for 7 days at 70° C.
Figure 2:
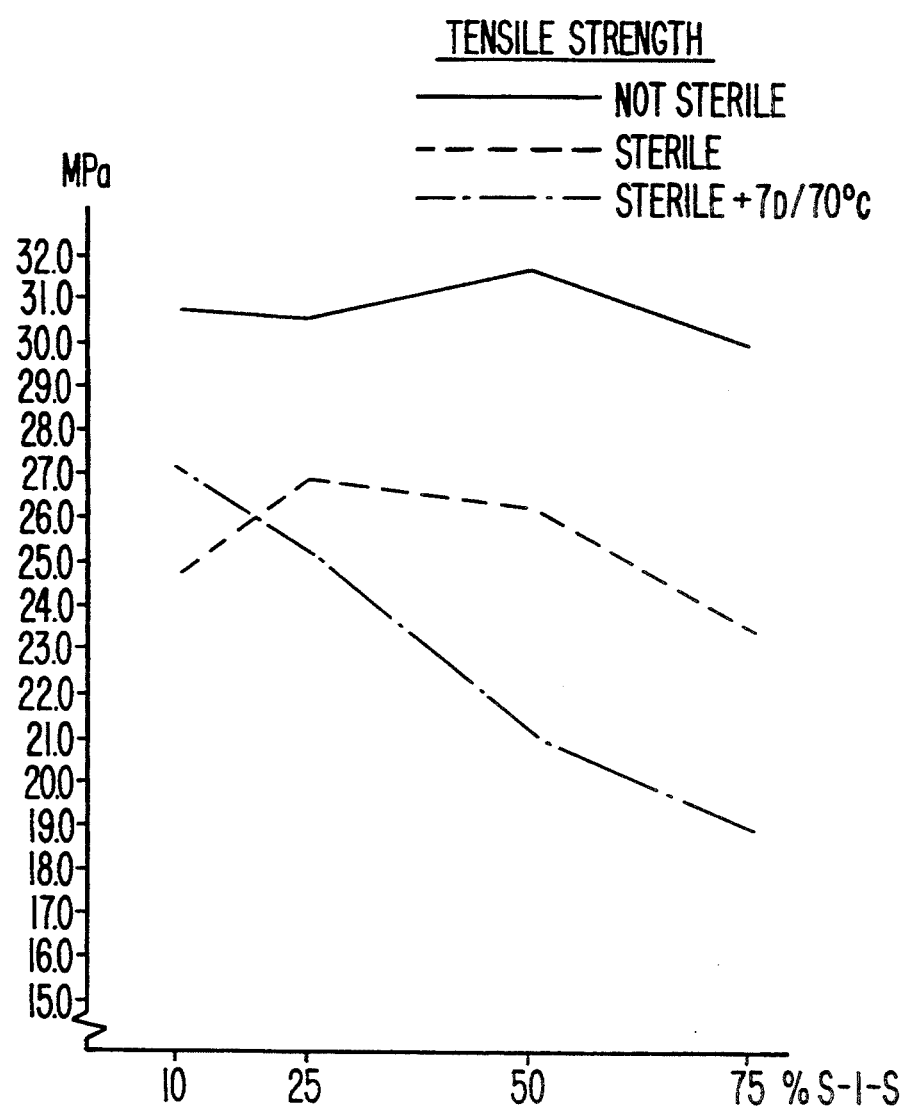
FIG. 2 shows the tensile strength of a not sterilized sample, a sterilized specimen and a sterilized specimen aged for 7 days at 70° C.
Figure 3:
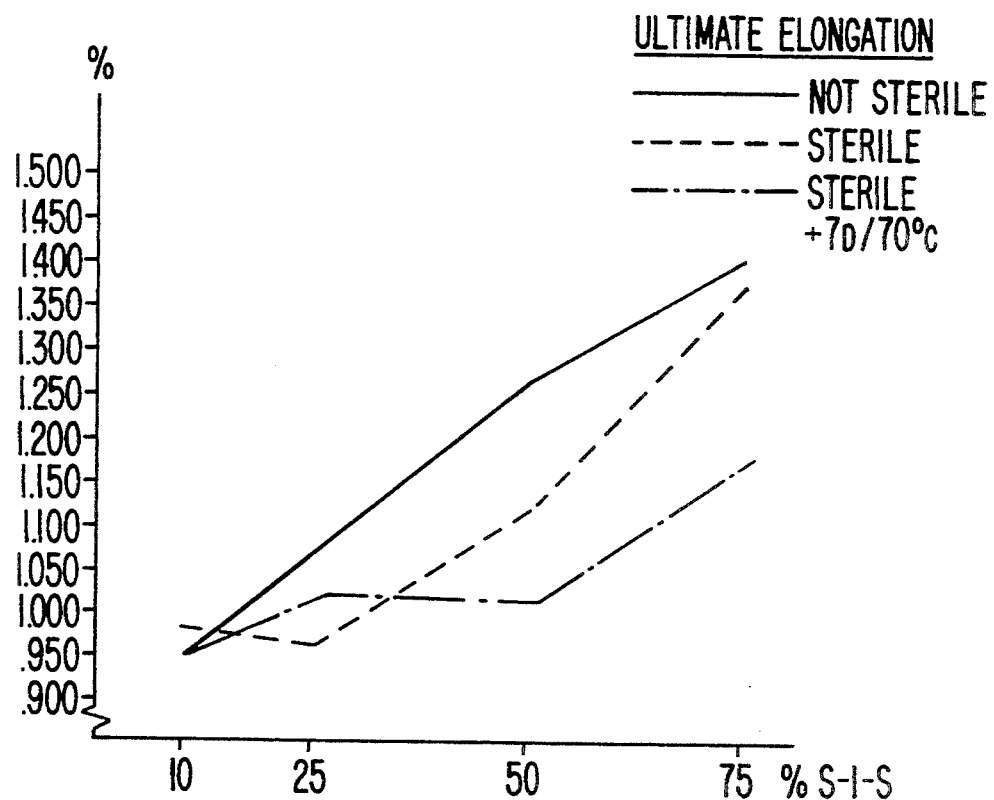
FIG. 3 shows the elongation of a not sterilized specimen, a sterilized specimen and a sterilized specimen aged for 7 dyas at 70°.

From FIG. 1 will be seen that an increased content of the S-I-S-copolymer causes a considerable drop in modulus, but this has a surprisingly small effect on the tensile strength, see FIG. 2, which substantially remains constant. The elongation stated in FIG. 3 is increased in a way to be expected. The tear resistance stated in FIG.

Figure 5:
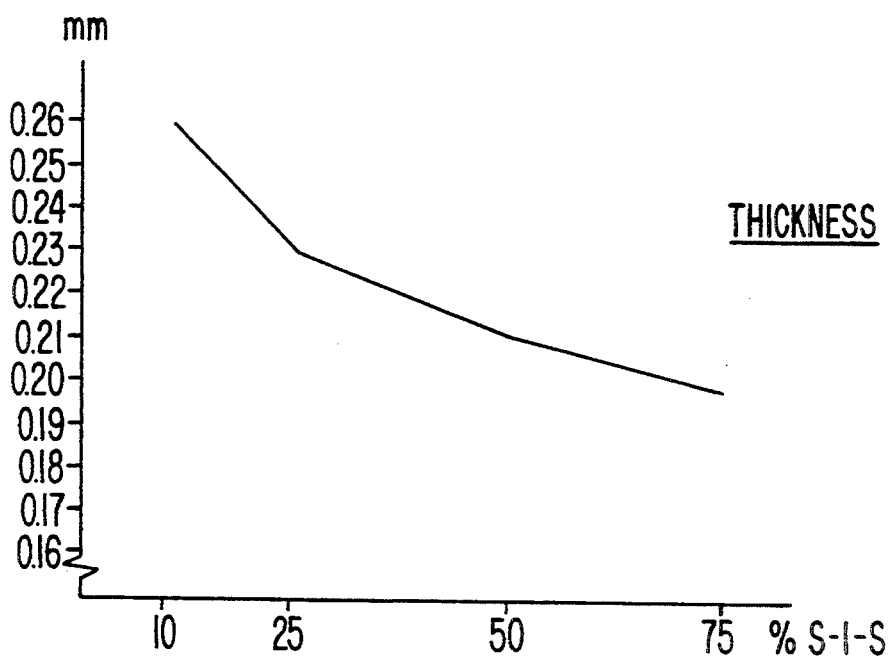
FIG. 5 shows the wall-thickness of the specimen.
Figure 4:
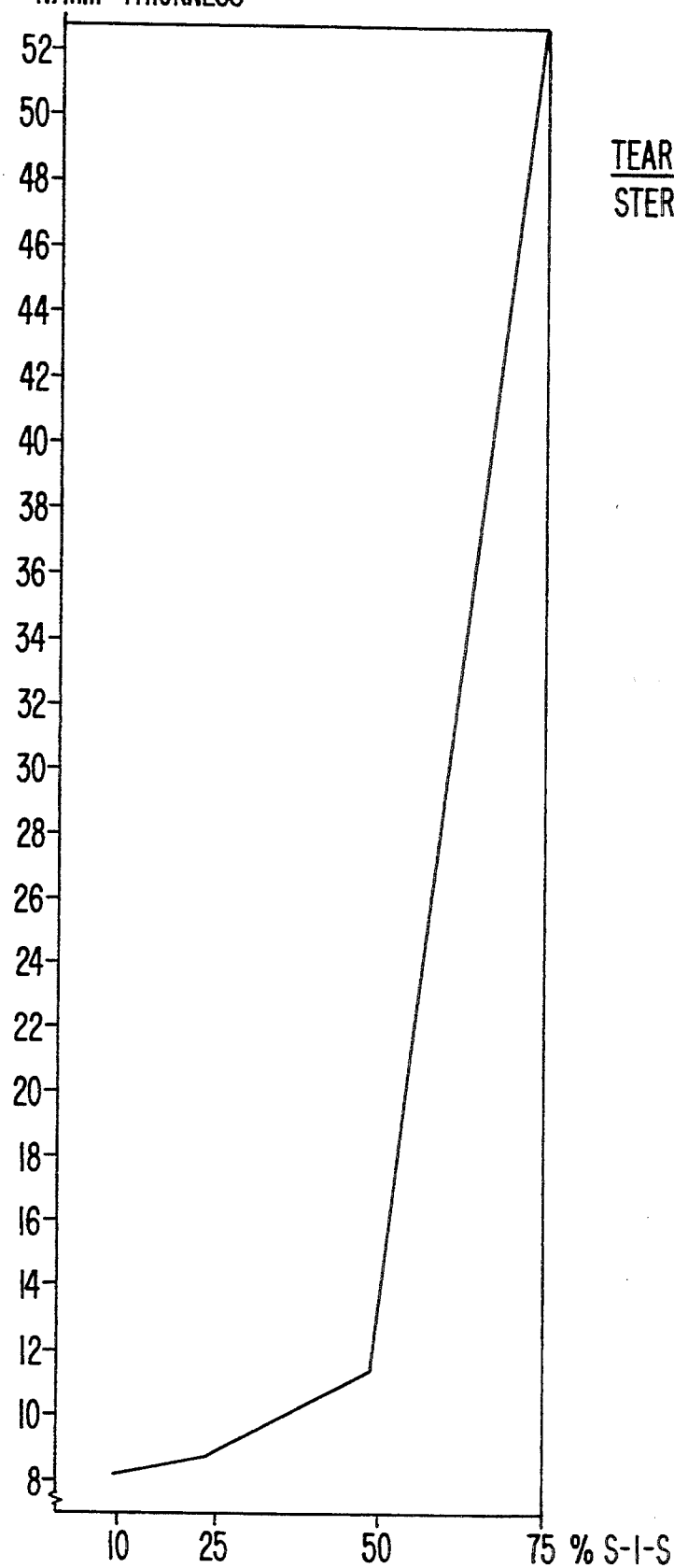
FIG. 4 shows the tear resistance of a sterilized specimen.

4 is surprisingly increasing considerably by an increased content of the S-I-S-copolymer. From FIG. 5 will be seen that the thickness of the rubber article decreases by an increased content of the S-I-S-copolymer on account of the lower viscosity of the solution and the subsequent reduced adherence to the form. If comparing FIG. 5 with FIG. 1 the necessity of adding a softener in the form of mineral oil becomes apparent, when small amounts of S-I-S-copolymers in the solution are used, if it is the object to produce thin-walled articles with a low modulus and a subsequent good tactility, where a low tear resistance is acceptable.

From FIG. 3 will be seen that the degree of reduction of the quality on account of the necessary radiation sterilization normally is independent of the content of the S-I-S-copolymer. The same applies to the further reduction of the quality, which takes place in the aging test (7 days at 70° C.). The reduction of the quality is, however, not so pronounced that the specimen do not comply with the present ASTM standard no. D3577-78 (1991).

Tests of the tear resistance of the various specimen are made on a dump bell specimen cut out of a rubber film with 8 mm between the parallel sides, in which an incision of 1 mm is made at the edge of one of the parallel sides. The tear resistance is then calculated as the ratio between the perpendicular force, which is to be applied to make the rubber film break, and the thickness of the film.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A thin-walled rubber article, said walls consisting essentially of styrene-isoprene-styrene (S-I-S) triblock copolymer, and styrene-butadiene-styrene (S-B-S) triblock copolymer and, optionally, styrene-olefin-styrene (S-O-S) triblock copolymer, with a S-I-S content from 10 to 75% by weight and an S-B-S content from 1 to 90% by weight, and said walls having a relatively high degree of tear resistance.

2. A rubber article according to claim 1, wherein the article contains from 60 to 75% by weight S-I-S triblock copolymer.

3. A rubber article according to claim 1, wherein the S-I-S triblock copolymer has a styrene content of from 10 to 30% by weight and a solution viscosity in a 25% by weight solution in toluene at 25° C. of 0.5–5 Pa.s.

4. A rubber article according to claim 1, wherein the article contains 25–40% by weight S-B-S triblock copolymer.

5. A rubber article according to claim 1, wherein the S-B-S triblock copolymer has a styrene content of from 20 to 40% by weight and a solution viscosity in a 25% by weight solution in toluene at 25° C. of 0.5–30 Pa.s.

6. A rubber article according to claim 1, wherein the article contains about 2 parts by weight S-I-S triblock copolymer and about 1 part by weight S-B-S triblock copolymer.

7. A rubber article according to claim 1 further comprising a naphthenic or an aromatic mineral oil as plasticizer.

* * * * *

UNITED STATES PATENT AND TRADEMARK OFFICE
CERTIFICATE OF CORRECTION

PATENT NO. : 5,444,121
DATED : August 22, 1995
INVENTOR(S) : Torbjørn GRENNES, ET AL It is certified that error appears in the above-identified patent and that said Letters Patent is hereby corrected as shown below:

On the title page, Item [54] and Column 1, line 1, should read

[54] THIN-WALLED RUBBER ARTICLE WITH WALLS HAVING A RELATIVELY HIGH DEGREE OF TEAR RESISTANCE --

On the title page: Item [73] should read

Assignee: DANPREN A/S, Albertslund, Denmark --

Signed and Sealed this

Nineteenth Day of December, 1995

*Attest:*

BRUCE LEHMAN

*Attesting Officer*     *Commissioner of Patents and Trademarks*